United States Patent
Takenaka (10) Patent No.: US 9,256,312 B2
(45) Date of Patent: Feb. 9, 2016

(54) COMMUNICATION DEVICE AND COMMUNICATION SYSTEM

(75) Inventor: Tetsuya Takenaka, Yamato (JP)

(73) Assignee: KYOCERA Corporation, Kyoto (JP)

( * ) Notice: Subject to any disclaimer, the term of this patent is extended or adjusted under 35 U.S.C. 154(b) by 48 days.

(21) Appl. No.: 14/114,152

(22) PCT Filed: Apr. 25, 2012

(86) PCT No.: PCT/JP2012/002849
§ 371 (c)(1),
(2), (4) Date: Oct. 25, 2013

(87) PCT Pub. No.: WO2012/147346
PCT Pub. Date: Nov. 1, 2012

(65) Prior Publication Data
US 2014/0043276 A1    Feb. 13, 2014

(30) Foreign Application Priority Data
Apr. 26, 2011    (JP) ................. 2011-098762

(51) Int. Cl.
*G06F 3/041* (2006.01)
*A63F 13/30* (2014.01)
*H04M 1/725* (2006.01)

(52) U.S. Cl.
CPC .............. *G06F 3/0414* (2013.01); *A63F 13/12* (2013.01); *H04M 1/72544* (2013.01); *A63F 2300/1037* (2013.01); *A63F 2300/1056* (2013.01); *A63F 2300/204* (2013.01); *A63F 2300/406* (2013.01); *A63F 2300/535* (2013.01); *H04M 1/7253* (2013.01); *H04M 2250/22* (2013.01)

(58) Field of Classification Search
CPC .................. G06F 3/0414; A63F 13/12; A63F 2300/1037; A63F 2300/204; A63F 2300/535; A63F 2300/1056; A63F 2300/406; A63F 13/2145; H04M 1/72544; H04M 2250/22; H04M 1/7253
USPC ........................................................... 345/173
See application file for complete search history.

(56) References Cited

U.S. PATENT DOCUMENTS

2004/0147315 A1    7/2004 Monden
2007/0075915 A1*   4/2007 Cheon et al. ................... 345/1.1
(Continued)

FOREIGN PATENT DOCUMENTS

JP    2002049681 A    2/2002
JP    2004-173940 A    6/2004
(Continued)

OTHER PUBLICATIONS

An Office Action; "Notice of Reason for Rejection," issued by the Japanese Patent Office on Oct. 21, 2014, which corresponds to Japanese Patent Application No. 2013-511932 and is related to U.S. Appl. No. 14/114,152; with English language concise explanation.

*Primary Examiner* — Premal Patel
(74) *Attorney, Agent, or Firm* — Studebaker & Brackett PC (57) ABSTRACT

A communication device (1) includes a communication unit (60) that communicates with another communication device, a display unit (30) that displays an object corresponding to an object displayed on a display unit of the other communication device, and a control unit (10) that controls the communication unit (60) to transmit threshold information associated with the object displayed on the display unit (30) to the other communication device.

4 Claims, 8 Drawing Sheets

(56) References Cited

U.S. PATENT DOCUMENTS

| | | |
|---|---|---|
| 2008/0064499 A1 | 3/2008 | Grant et al. |
| 2010/0281363 A1* | 11/2010 | Inaba .......................... 715/702 |
| 2010/0304816 A1 | 12/2010 | Kitamura et al. |
| 2011/0169765 A1 | 7/2011 | Aono |
| 2012/0196664 A1 | 8/2012 | Grant et al. |

FOREIGN PATENT DOCUMENTS

| | | |
|---|---|---|
| JP | 2006-163579 A | 6/2006 |
| JP | 2010-503461 A | 2/2010 |
| JP | 2010-152716 A | 7/2010 |
| JP | 2010-273867 A | 12/2010 |
| JP | 2011-048409 A | 3/2011 |

* cited by examiner

COMMUNICATION DEVICE AND COMMUNICATION SYSTEM

CROSS REFERENCE TO RELATED APPLICATION

This application claims priority to and the benefit of Japanese Patent Application No. 2011-098762 filed on Apr. 26, 2011, the entire contents of which are incorporated herein by reference.

TECHNICAL FIELD

The present invention relates to a communication device and to a communication system. In greater detail, the present invention relates to a communication device that communicates information based on user operation and to a communication system that includes the communication device.

BACKGROUND

A variety of techniques are known for interactive exchange of a variety of information using devices such as, for example, mobile phones or portable game devices that communicate with each other over a wired or wireless connection.

Typical examples include participating in a game over a network. In such a game, a plurality of communication devices are connected over a network, and a variety of services that would be impossible with only one device are provided, for example allowing a plurality of users to compete or cooperate.

A communication system that uses such a network is not limited to games and is attracting attention from businesses in all fields as a possible medium for providing a variety of new services. One example of a proposed technique to allow for such services is an entertainment system that is not limited to network gaming but can also provide marketing or advertisement information (for example, see JP2002-049681A (Patent Literature 1)).

CITATION LIST

Patent Literature 1: JP2002-049681A

According to the communication system disclosed in Patent Literature 1, a game that entices users to take action in the real world can be provided, thus linking the virtual world with the real world and providing a more entertaining network game. Furthermore, this communication system can also be expected to provide effective advertising by associating game content with advertisements for stores or facilities in the real world.

SUMMARY

When participating in a game or the like over a network, users are made to feel that they are competing or cooperating while in the same location or nearby, even if the users are separated from each other.

When users cooperate or compete in this way, however, if the operations that a user can execute on the device does not provide a realistic sensation, the enjoyment when a user executes an operation will be lost. When users interact to cooperate or compete in this way, it is preferred that users are provided with a realistic interactive operational feel.

As described above, with content accessible over a network, users are made to feel that they are nearby, even when they are separated from each other. Accordingly, despite being provided with this feeling, the appeal of cooperation or competition between users will be drastically diminished if the way in which users execute operations is not realistic.

The present invention has been conceived in light of the above circumstances and provides a communication device that can provide a realistic interactive operational feel as well as a communication system that includes the communication device.

A communication device according to a first aspect of the present invention for providing the above is a communication device including: a communication unit configured to communicate with another communication device; a display unit configured to display an object corresponding to an object displayed on a display unit of the other communication device; and a control unit configured to control the communication unit to transmit threshold information associated with the object displayed on the display unit to the other communication device.

A second aspect of the present invention is the communication device according to the first aspect, further including a pressure detection unit configured to detect pressure. The control unit generates the threshold information in accordance with data based on pressure detected by the pressure detection unit and controls the communication unit to transmit the threshold information to the other communication device as the threshold information associated with the object that is displayed on the display unit of the other communication device and that corresponds to the object displayed on the display unit.

A communication system according to a third aspect of the present invention for providing the above is a communication system including a first communication device and a second communication device. The first communication device transmits threshold information associated with an object displayed on a display unit of the first communication device to the second communication device, and the second communication device receives the threshold information transmitted by the first communication device and associates the threshold information with an object that is displayed on a display unit of the second communication device and that corresponds to the object displayed on the display unit of the first communication device.

A fourth aspect of the present invention is the communication system according to the third aspect, in which the first communication device and the second communication device are each provided with a pressure detection unit configured to detect pressure, the first communication device generates the threshold information in accordance with data based on pressure detected by the pressure detection unit of the first communication device, and based on the threshold information received from the first communication device, the second communication device sets a threshold for data based on pressure detected by the pressure detection unit of the second communication device.

According to the present invention, a communication device that can provide a realistic interactive operational feel as well as a communication system that includes the communication device can be provided.

BRIEF DESCRIPTION OF DRAWINGS

The present invention will be further described below with reference to the accompanying drawings, wherein.

DESCRIPTION OF EMBODIMENTS

The following describes embodiments of the present invention with reference to the drawings. In the following embodiments, a portable communication device, such as a mobile phone or a portable game device, is described as an example of the communication device according to the present invention. The communication device in which the present invention can be adopted is not, however, limited to a mobile phone, portable game device, or the like. The present invention can be adopted in any device having a touch panel, such as a PDA, smartphone, tablet PC, or the like. Furthermore, the present invention is not limited to portable communication devices and can be adopted in any device having a touch panel such as a bank ATM, a ticket vending machine in a station, and the like.

Embodiment 1

Figure 1:
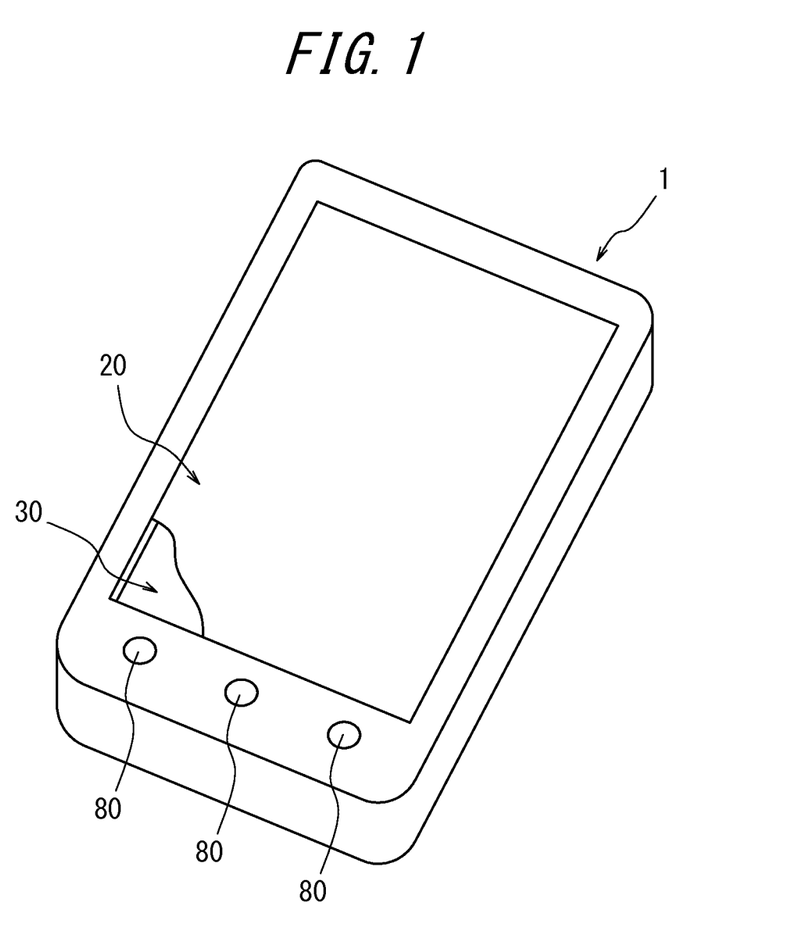
FIG. 1 is an external perspective view of a communication device according to Embodiment 1 of the present invention.

FIG. 1 is an external perspective view schematically illustrating the configuration of a communication device according to Embodiment 1 of the present invention. A communication device 1 is provided with a display unit 30, as illustrated by a cutaway portion on the front face of the device, and with a touch panel 20 provided on the front face of the display unit 30. The touch panel 20 is configured using a matrix switch or the like and detects contact by a user's finger, a stylus pen, or the like (hereinafter simply referred to as a "contacting body"). The display unit 30 is configured using a liquid crystal display (LCD), an organic EL display, or the like, and displays a variety of information and rendered shapes of keys, buttons, and the like. Accordingly, in the present embodiment, the "touch panel" is described as being provided on the front face of the display unit 30, which may for example be an LCD. In other words, the touch panel is described as a separate member from the display unit 30. Hereinafter, an image of a key, button, folder, file icon, or the like displayed on the display unit 30 for executing predetermined processing based on user operation on the touch panel 20 is referred to simply as an "object". In other words, an object is an image that suggests, to the user, a region on the touch panel 20 to be contacted.

The communication device 1 is preferably also provided with an operation input unit 80 that includes at least one functional key. Furthermore, when the communication device 1 is a mobile phone, for example, an audio input unit configured using a microphone or the like and an audio output unit configured using a speaker or the like are also provided. Details on these units are omitted. Additionally, depending on the necessary functionality, the communication device 1 may be provided with a digital camera functional unit, a one-segment broadcast tuner, a near field communication unit such as an infrared communication functional unit, a variety of interfaces, and the like. Details on these units are omitted here and in the drawings.

Figure 2:
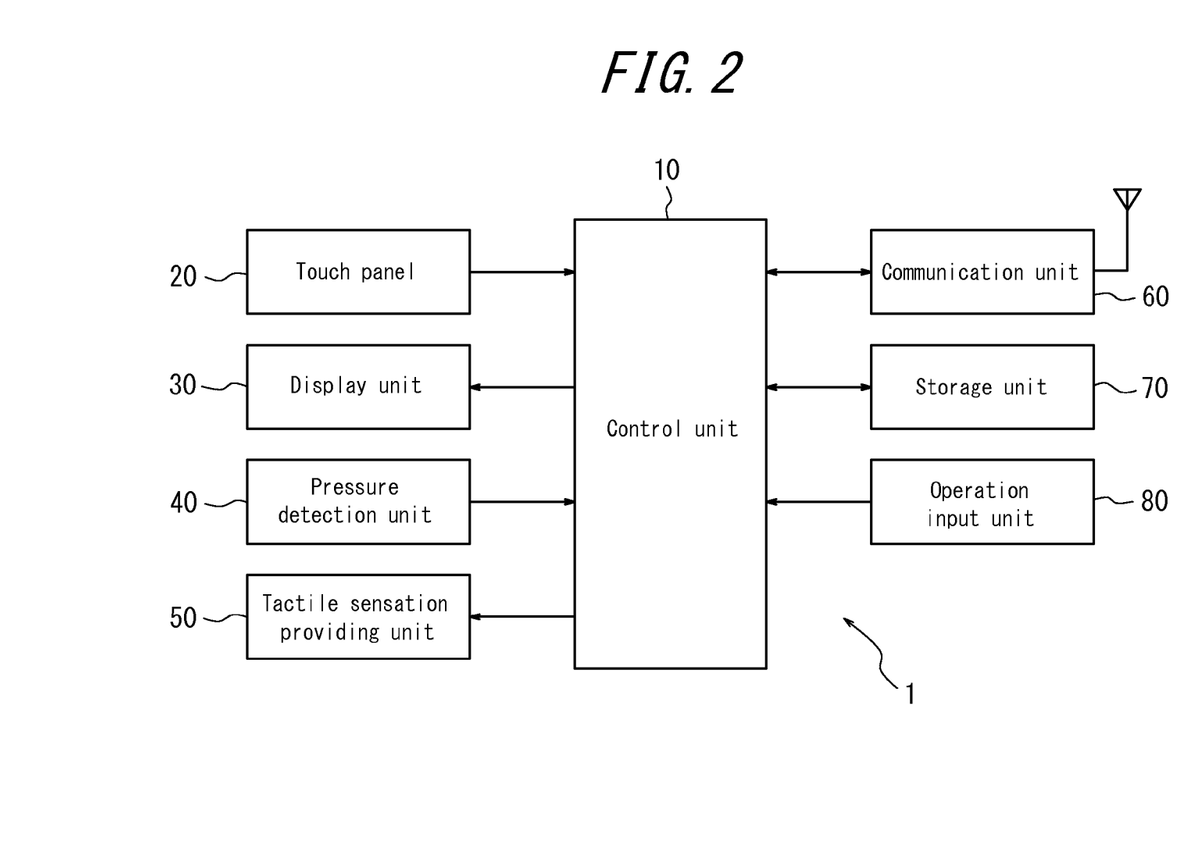
FIG. 2 is a functional block diagram illustrating the internal structure of the communication device according to Embodiment 1.

FIG. 2 is a functional block diagram schematically illustrating the internal structure of the communication device 1 according to the present embodiment. As illustrated in FIG. 2, the communication device 1 is provided with a control unit 10, a touch panel 20, a display unit 30, a pressure detection unit 40, a tactile sensation providing unit 50, a communication unit 60, a storage unit 70, and an operation input unit 80.

The control unit 10 controls and manages the entire communication device 1, starting with the functional blocks thereof. The processing executed by the control unit 10 is described in detail below.

As described above, the touch panel 20 is configured by being overlaid on the front face of the display unit 30 and detects contact by a contacting body. By detecting contact by the contacting body, the touch panel 20 outputs a signal corresponding to the position at which the contact was detected to the control unit 10. The touch panel 20 is configured using, for example, a resistive film type, a capacitive type, or other type of touch panel. In order for the touch panel 20 to detect contact by the contacting body, it is not essential that the contacting body physically contact the touch panel 20. For example, if the touch panel 20 is an optical type, the touch panel 20 detects the position at which an infrared ray on the touch panel 20 is blocked by the contacting body, and therefore the contacting body need not contact the touch panel 20.

In addition to providing display corresponding to applications, the display unit 30 renders a user interface formed by objects in a predetermined display region. Furthermore, in accordance with the applications, the display unit 30 displays a variety of information such as input results and the like.

The pressure detection unit 40 detects pressure on the touch panel 20 when the user executes an operation and is, for example, configured using a strain gauge sensor, an element such as a piezoelectric element, or the like that experiences a change in physical or electrical characteristics (strain, resistance, voltage, or the like) in response to pressure. When the pressure detection unit 40 is configured using a piezoelectric element, for example, the magnitude of the voltage (voltage value (hereinafter referred to as data based on pressure)), which is an electrical characteristic, of the piezoelectric element changes in accordance with the magnitude of the load (force) of the pressure on the touch panel 20 (or the speed at which the magnitude of the load (force) changes (acceleration)). When the data based on pressure is equal to or greater than a predetermined threshold, the control unit 10 executes control for predetermined processing based, for example, on an application.

The control unit 10 acquires the data based on pressure by the pressure detection unit 40 notifying the control unit 10 of the data based on pressure, or by the control unit 10 detecting the data based on pressure of the pressure detection unit 40. The control unit 10 thus acquires data based on pressure on the touch panel 20 from the pressure detection unit 40. Note that instead of a voltage value, the data based on pressure may be power, resistance, the magnitude of the load of the pressure, or the like.

Furthermore, the pressure detection unit 40 may be configured in accordance with the contact detection type of the touch panel 20. For example, if the touch panel 20 is a resistive film type, then a configuration without a strain gauge sensor, a piezoelectric element, or the like may be adopted by associating the magnitude of resistance corresponding to the size of the contact area with the load (force) of pressure on the touch face of the touch panel. Alternatively, if the touch panel 20 is a capacitive type, a configuration without a strain gauge sensor, a piezoelectric element, or the like may be adopted by associating the magnitude of the capacitance with the load (force) of the pressure on the touch panel.

The tactile sensation providing unit 50 vibrates the touch panel 20 and is configured using, for example, a piezoelectric element, an ultrasonic transducer, or the like. The structural relationship between the pressure detection unit 40 and the tactile sensation providing unit 50, and between the touch panel 20 and the display unit 30, is described below.

By vibrating in accordance with pressure (pressure on the touch panel) detected by the pressure detection unit 40, the tactile sensation providing unit 50 can produce vibration to provide a tactile sensation to the user's finger or the like, so that the user applying pressure to the touch panel 20 can recognize in a sensory way that an operation has been executed. Note that the pressure detection unit 40 and the tactile sensation providing unit 50 can be configured integrally. When the pressure detection unit 40 and the tactile sensation providing unit 50 are both configured using a piezoelectric element, these units may be configured as a pressure detection and tactile sensation providing unit that share a common piezoelectric element. The reason is that a piezoelectric element generates voltage when pressure is applied and deforms upon application of voltage.

The tactile sensation providing unit 50 can also be configured to generate a vibration by driving a piezoelectric element that also serves as the pressure detection unit 40 when the magnitude of the voltage (voltage value (data)) of the piezoelectric element satisfies a predetermined threshold. Stating that the magnitude of the voltage (voltage value (data)) of the piezoelectric element satisfies a predetermined threshold may refer to the voltage value (data) reaching a predetermined standard, to the voltage value (data) exceeding a predetermined standard, or to detection of a voltage value (data) equivalent to a predetermined standard.

The communication unit 60 communicates with another communication device or the like over a non-illustrated network. In FIG. 2, the communication unit 60 is described as being provided with an antenna and communicating wirelessly with another communication device over a network. The communication device 1 of the present embodiment, however, is not limited to communicating wirelessly with another communication device over a network and may communicate with another communication device without accessing a network, for example by near field communication such as Bluetooth (registered trademark) or the like. Furthermore, the communication device 1 of the present embodiment is not limited to communicating wirelessly with another communication device and may communicate over a wired connection, for example by being connected to another communication device with a cable. In such a case, the communication unit 60 is provided with a terminal to which can be connected a communication cable that is connected to another communication device.

The storage unit 70 stores a variety of applications, a variety of input information, and the like and also functions as a work memory and the like. The storage unit 70 also stores a plurality of templates and the like that include a variety of objects used with applications.

The operation input unit 80 outputs a signal corresponding to user operation to the control unit 10. The use and function of the keys forming the operation input unit 80 are prescribed in accordance with the application in use.

Next, the structural relationship between the above-described pressure detection unit 40 and the tactile sensation providing unit 50, and between the touch panel 20 and the display unit 30, is described.

Figure 3A:
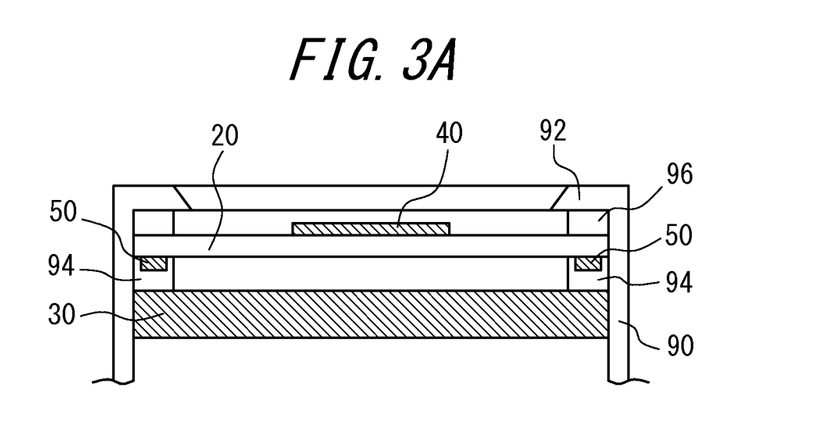
FIG. 3 illustrates an example of a housing structure for a touch panel, display unit, pressure detection unit, and tactile sensation providing unit in the communication device illustrated in FIG. 2.
Figure 3B:
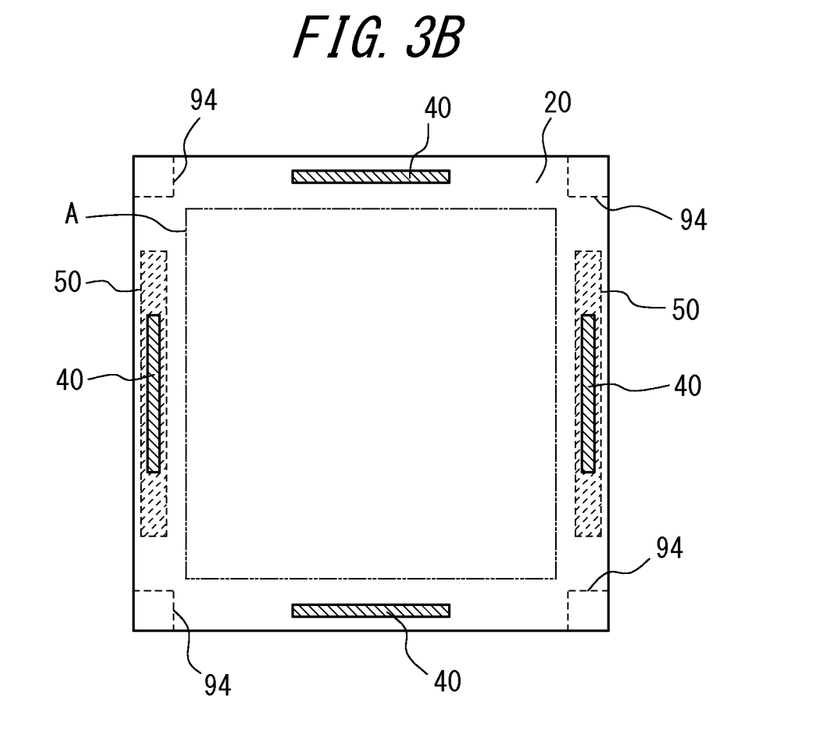

FIG. 3 illustrates an example of a housing structure for the touch panel 20, display unit 30, pressure detection unit 40, and tactile sensation providing unit 50 of the communication device 1 illustrated in FIG. 2. FIG. 3(A) is a cross-sectional diagram of some parts, and FIG. 3(B) is a plan view of the parts.

The display unit 30 displays a variety of objects on the touch panel 20 and is held and stored within a housing 90. The touch panel 20 is held above the display unit 30 via an insulator 94 made from an elastic member. The communication device 1 according to the present embodiment is rectangular in plan view of the display unit 30 and the touch panel 20. In FIG. 3, the touch panel 20 is illustrated as a square yet can be a rectangle or other shape in accordance with the specifications of the communication device 1 into which the touch panel 20 is mounted. Furthermore, in the communication device 1, the touch panel 20 is held by the display unit 30 via four insulators 94 provided respectively at the four corners, away from a display region A of the display unit 30 illustrated in FIG. 3(B) by phantom lines.

In the housing 90, an upper cover 92 is provided so as to cover a surface region of the touch panel 20 away from the display region of the display unit 30. An insulator 96 made from an elastic member is provided between the upper cover 92 and the touch panel 20.

The surface of the touch panel 20, i.e. the face on which the user executes operations, is for example configured using a transparent film. The back face of the touch panel 20 is configured with glass. The transparent film used on the surface of the touch panel 20 is configured to flex (bend) slightly in accordance with pressure on an operation face when pressure is applied to the operation face.

Furthermore, in the communication device 1 according to the present embodiment, a strain gauge sensor is provided, via adhesive or the like, on the transparent film on the surface of the touch panel 20 near each side covered by the upper cover 92, in order to detect pressure applied to the touch panel 20. On the glass surface of the back face of the touch panel 20, a piezoelectric element, an ultrasonic transducer, or the like is provided, via adhesive or the like, near each of two opposing sides in order to vibrate the touch panel 20. In other words, in the communication device 1 illustrated in FIG. 3, the pressure detection unit 40 illustrated in FIG. 2 is configured using four strain gauge sensors, and the tactile sensation providing unit 50 is configured using two vibrating elements. By generating vibration, the tactile sensation providing unit 50 can transmit vibration to the contacting body, such as a user's finger, stylus pen, or the like, that is applying pressure to the touch panel 20. The tactile sensation providing unit 50 is driven by, for example, two in-phase ultrasonic transducers. Note that the housing 90, upper cover 92, and insulators 96 illustrated in FIG. 3(A) are omitted from FIG. 3(B).

With the control unit 10, the communication device 1 according to the present embodiment monitors contact detected by the touch panel 20 and monitors the data based on pressure detected by the pressure detection unit 40. The control unit 10 can determine whether the data based on pressure detected by the pressure detection unit 40 is equal to or greater than a predetermined threshold (a threshold for the data based on pressure in order to execute predetermined processing). Note that the pressure detection unit 40 detects pressure by, for example, an average of the output of four strain gauge sensors.

The "predetermined threshold (a threshold for the data based on pressure in order to execute predetermined processing)" is a threshold serving as a standard when the communication device 1 described below executes predetermined processing. When the pressure detection unit 40 detects pressure for which the data based on pressure is equal to or greater than the predetermined threshold, the control unit 10 executes predetermined processing. The predetermined processing is associated in advance with each object displayed on the display unit 30. When the pressure detection unit 40 detects pressure for which the data based on pressure is equal to or greater than the predetermined threshold, and furthermore when the touch panel 20 detects contact at the position of the touch panel 20 corresponding to an object displayed on the display unit 30, the control unit 10 executes the predetermined processing associated with the object. Based on the predetermined processing being executed, the communication device 1 of the present embodiment executes a variety of operations.

The following describes the case of determining whether data based on pressure equal to or greater than the predetermined threshold has been detected. A variety of ways may be conceived to determine that "data based on pressure equal to or greater than the threshold has been detected". For example, it may also be determined that "data based on pressure equal to or greater than the threshold has been detected" when the data based on pressure due to user operation on an object has reached the threshold (i.e. when the touch panel 20 detects contact at a position on the touch panel 20 corresponding to an object displayed on the display unit 30, and the data based on pressure detected by the pressure detection unit 40 reaches the threshold). It may also be determined that "data based on pressure equal to or greater than the threshold has been detected" when, for example, the data based on pressure due to user operation on an object exceeds the threshold. Furthermore, it may be determined that "data based on pressure equal to or greater than the threshold has been detected" when the pressure detection unit 40 detects data based on pressure indicating the threshold.

Figure 4:
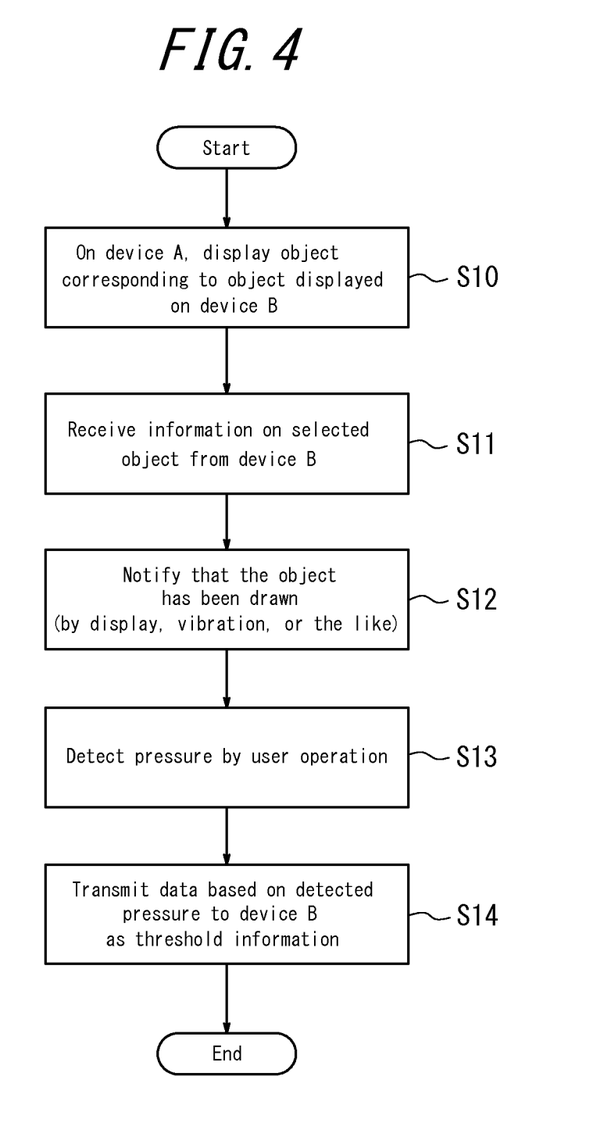
FIG. 4 is a flowchart illustrating processing for transmission by the communication device according to Embodiment 1.
Figure 5:
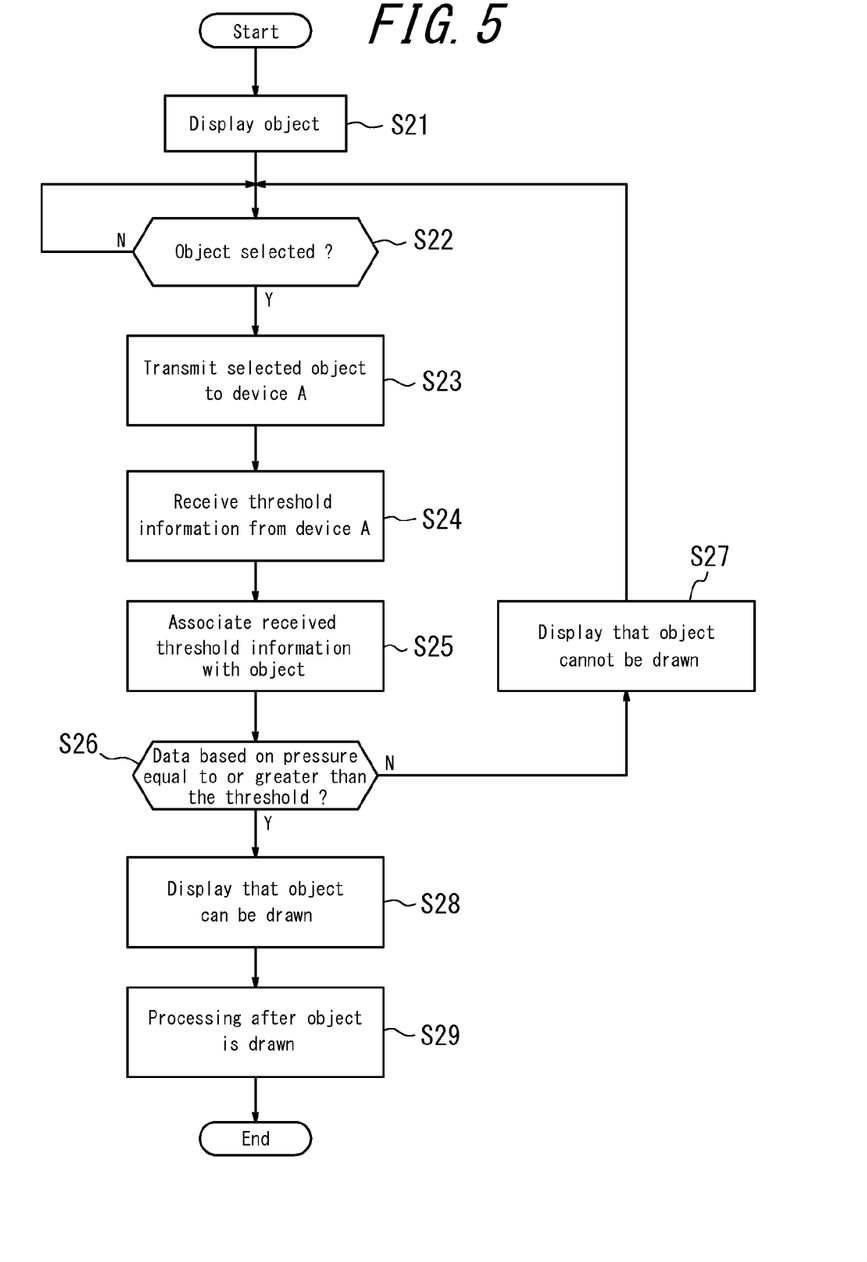
FIG. 5 is a flowchart illustrating processing for reception by the communication device according to Embodiment 1.
Figure 6:
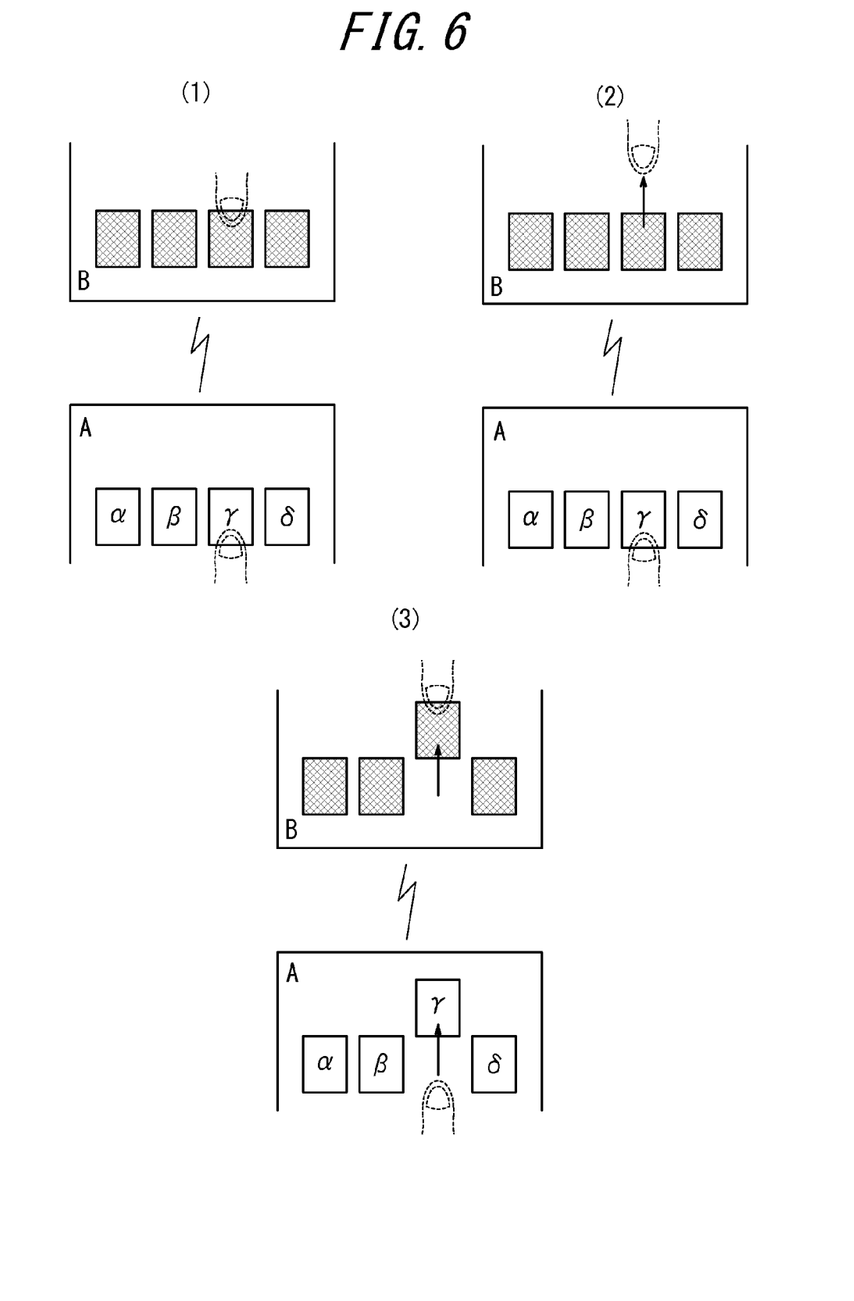
FIG. 6 illustrates an example of processing by the communication device according to Embodiment 1.

Next, with reference to FIGS. 4 to 6, processing by the communication device 1 according to the present embodiment is described. In the description below, two users, A and B, each have a respective device and are executing operations. In this case, user A and user B are each assumed to have the above-described communication device 1.

As an example of a situation in which the communication device 1 according to the present embodiment executes processing, the following describes how, during a card game being reproduced on the communication device 1, user B executes an operation to select and draw at least one of the cards held by user A. In this context, an operation to "draw a card" refers to a user operation whereby, after selecting at least one of the other player's cards, the user executes an operation such as receiving or flipping the selected card(s) by dragging the card(s) towards himself. Hereinafter, a variety of operations a user executes on a "card" are described, assuming that in actuality the user executes a variety of operations, on the touch panel 20, on an "object" representing a card displayed on the display unit 30 of the communication device 1.

In the present embodiment, based on the user executing an operation to "draw a card", the communication device 1 reproduces the appearance of the card being drawn. In this context, processing required for the communication device 1 to reproduce the appearance of a card being drawn corresponds to the above-described "predetermined processing". In other words, the control unit 10 executes the "predetermined processing" upon determining that the data based on pressure due to a user operation on a card, in particular an operation to drag the card to the user's side, is equal to or greater than a predetermined threshold. Based on the control unit 10 executing the predetermined processing, the communication device 1 reproduces the appearance of the card being drawn. In this context, an operation to drag a card to the user's side is an operation by which the user contacts the touch panel 20 with the contacting body at a position corresponding to a card displayed on the display unit 30 and then slides the contacting body towards the user's side without releasing the contacting body from the touch panel 20.

In such a situation, if for example the cards held by user A were displayed on the display unit of the communication device held by user B, and user B selected a card by executing an operation to contact the card, then the card would be drawn automatically. In this case, however, as part of the psychological tactics players use, a player may not want to let the opponent easily draw the selected card.

In such a case, a measure might be taken such as letting a player move a card he does not want the opponent to draw to the edge of the display unit, or having an alarm sound when the opponent tries to draw the card. On the other hand, when a user grips actual cards in his hand and plays a game, he can apply the tactic of tightening his grip when the opponent tries to draw a card the player does not wish to be drawn, so that the opponent cannot easily draw the card.

Accordingly, in a game played over a network, where the opponent is not physically present, a realistic interactive operational feel can be provided by reproducing such a tactic to adjust force subtly. The communication device 1 according to the present embodiment makes such an operation possible. Below, the operations for applying the above tactic are described for a card game. In an actual game, the processing for these operations would be incorporated as a portion of an entire game program.

First, processing by the communication device 1 on the transmitting end according to the present embodiment is described. In this context, the communication device 1 "on the transmitting end" refers to the communication device operated by the above-described user A, i.e. the device for the user (A) whose card is selected and drawn by user B. Below, the communication device 1 held by user A whose card is being drawn is labeled "communication device 1A" when appropriate, whereas the communication device 1 held by user B who is drawing a card is labeled "communication device 1B" when appropriate. Accordingly, both communication device 1A and communication device 1B are included in the communication system of the present embodiment. Note that in the drawings, these devices are simply labeled "device A" and "device B".

FIG. 4 is a flowchart describing processing by the communication device 1A on the transmitting end according to the present embodiment. Note that before starting processing by the communication device 1A illustrated in FIG. 4, a plurality of card objects are displayed on the display unit 30 of the communication device 1B.

When the processing by the communication device 1A begins, the control unit 10 of the communication device 1A controls the display unit 30 to display an object corresponding to each object displayed on the display unit 30 of the communication device 1B (step S10). Once the processing in step S10 is executed, the display on the display unit 30 of each of the communication devices 1A and 1B is, for example, as illustrated in state (1) of FIG. 6.

State (1) of FIG. 6 illustrates the display unit 30 of the communication device 1B at the top and the display unit 30 of the communication device 1A at the bottom, thus illustrating how the communication devices 1A and 1B which actually exist apart from each other communicate wirelessly. As illustrated in state (1) of FIG. 6, the display unit 30 of each of the communication devices 1A and 1B displays objects rendered as cards used in a card game.

On the display unit 30 of the communication device 1A for user A, from whom a card is being drawn, the face of the cards held by the user is shown. The example illustrated in state (1) of FIG. 6 shows four cards: α, β, γ, and δ. On the display unit 30 of the communication device 1B for user B, who is drawing a card, the back of the cards held by user A is shown, so that user B cannot see the face of the cards. In the example illustrated in state (1) of FIG. 6, the four cards displayed on the display unit 30 of the communication device 1B for user B correspond, from left to right, to the four cards α, β, γ, and δ displayed on the display unit 30 of the communication device 1A for user A.

Once a predetermined object is displayed in step S10, the control unit 10 controls the communication unit 60 to receive, from the communication device 1B, information on the object selected by user B (step S11). In other words, when user B executes an operation on the touch panel 20 of the communication device 1B to select at least one card object displayed on the display unit 30 (when the touch panel 20 detects contact at a position on the touch panel 20 corresponding to at least one card object displayed on the display unit 30), the control unit 10 receives information on the selected object from the communication device 1B. In this way, it can be known on the communication device 1A which card user B of the communication device 1B selected.

Once the information on the selected object is received from the communication device 1B in step S11, the control unit 10 controls the display unit 30 to notify the user that an object has been selected and is being drawn (step S12). In other words, in step S12, user A is notified of the card that user B selects and is attempting to draw, and therefore on the communication device 1A, the control unit 10 controls the display unit 30 to change the display color of the selected card, for example, or the display state. Furthermore, instead of or in addition to causing such display by the display unit 30, the control unit 10 may also control the tactile sensation providing unit 50 to provide a tactile sensation, for example by vibrating the touch panel.

Once notification that an object has been selected and is being drawn has been provided in step S12, the control unit 10 controls the pressure detection unit 40 to detect pressure due to user A executing an operation on the touch panel 20 (step S13). In other words, on the communication device 1A, user A can learn by display or tactile sensation that, on the communication device 1B, user B is for example attempting to draw the second card from the right, as illustrated in state (1) of FIG. 6. At this point, in step S13, the control unit 10 controls the pressure detection unit 40 to detect pressure when user A presses down on card γ by applying pressure to the touch panel 20, as illustrated in state (1) of FIG. 6. Note that in step S13, when user A is not pressing down on any card, the pressure detection unit 40 detects a pressure of zero.

Note that when detecting pressure due to an operation by user A in step S13, an example has been described of detecting pressure on one card, as illustrated in state (1) of FIG. 6. An embodiment may be envisioned, however, in which only an operation to select a plurality of cards is first detected, for example, with the pressure on all of the selected cards being subsequently detected at a predetermined position on the touch panel 20. In this way, based on one pressure, it is possible to respond to a game situation in which a plurality of cards is selected.

When pressure due to an operation by user A is detected in step S13, the control unit 10 controls the communication unit 60 to transmit data based on the detected pressure to the communication device B as threshold information (step S14). In other words, in step S14, the communication unit 60 transmits the data based on pressure detected in step S13 to the communication device B as threshold information associated with an object displayed on the display unit 30. At this point, the control unit 10 generates threshold information based on the data based on pressure detected by the pressure detection unit 40. The control unit 10 then executes control so that this threshold information is transmitted to the communication device 1B as threshold information associated with an object that is displayed on the display unit of the communication device 1B in correspondence with an object displayed on the display unit 30. Processing after this threshold information is transmitted to the communication device 1B is described below. Note that while the pressure detection unit 40 is detecting pressure, the control unit 10 may continually generate threshold information based on the data based on pressure detected by the pressure detection unit 40 and transmit the threshold information to the communication device 1B. Furthermore, after the touch panel 20 detects contact, the control unit 10 may generate threshold information for the data based on pressure with the largest magnitude detected by the pressure detection unit 40 until the contact is released and transmit the threshold information to the communication device 1B.

Next, processing by the communication device 1 on the receiving end according to the present embodiment is described. In this context, the communication device 1 "on the receiving end" refers to the communication device operated by the above-described user B, i.e. the device for the user (B) who selects and draws at least one of the cards held by user A.

FIG. 5 is a flowchart describing processing by the communication device 1B on the receiving end according to the present embodiment. When the processing by the communication device 1B begins, the control unit 10 of the communication device 1B controls the display unit 30 to display a predetermined object (step S21). Note that the predetermined object displayed by the display unit 30 of the communication device 1B in step S21 is a plurality of card objects already displayed by the display unit 30 of the communication device 1B at the start of processing by the communication device 1A in FIG. 4. Accordingly, once the processing in step S21 is executed, the display on the display unit 30 of the communication device 1B is, for example, as illustrated at the top of state (1) of FIG. 6.

Once a predetermined object is displayed in step S21, the control unit 10 determines whether user B has selected an object (step S22). In other words, in step S22, the control unit 10 determines whether user B has executed an operation on the touch panel 20 of the communication device 1B to select at least one card object displayed on the display unit 30.

Once at least one card object is selected in step S22, the control unit 10 controls the communication unit 60 to transmit information on the selected object to the communication device 1A (step S23). Note that the information on the selected object transmitted to the communication device 1A in step S23 is received by the communication device 1A in step S11 of FIG. 4.

Once information on the selected object is transmitted to the communication device 1A in step S23, the control unit 10 controls the communication unit 60 to receive the threshold information transmitted by the communication device 1A (step S24). Note that the threshold information received by the communication device 1B in step S24 is the information transmitted by the communication device 1A in step S14 of FIG. 4.

Once the threshold information is received in step S24, the control unit 10 associates the received threshold information with the object selected in step S22 (step S25). In this way, the data based on pressure when user A applies pressure to an object on the communication device 1A is set as a threshold for the data based on pressure at which a corresponding object displayed on the display unit 30 of the communication device 1B can be drawn.

Once the threshold information is associated with an object in step S25, the control unit 10 determines whether the data based on pressure detected by the pressure detection unit 40 is equal to or greater than the set threshold for data based on pressure (step S26). In other words, in step S26, the control unit 10 determines whether user B, who operates the communication device 1B, is applying pressure equal to or greater than pressure by user A, who operates the communication device 1A, to an object on the communication device 1B corresponding to the object to which user A is applying pressure.

In step S26, when the data based on pressure detected by the pressure detection unit 40 of the communication device 1B is not equal to or greater than the threshold, the control unit 10 controls the display unit 30 to display that the selected object cannot be drawn (step S27). In step S27, the data based on pressure by user B, who operates the communication device 1B, is not equal to or greater than the set threshold. In other words, the pressure by user B, who operates the communication device 1B, does not reach the pressure by user A who operates the communication device 1A. Therefore, in step S27, the control unit 10 does not allow the selected object to be drawn on the communication device 1B operated by user B.

For example, as illustrated in state (1) of FIG. 6, assume that user A is pressing down on the card γ on the communication device 1A with a strong pressure. In this case, if the pressure when user B attempts to draw the corresponding card on the communication device 1B does not reach the pressure of user A, then as shown in state (2) of FIG. 6, user B cannot draw the card corresponding to the card γ. In this context, "display that the selected object cannot be drawn" can be embodied for example by not allowing the card corresponding to the card γ to be dragged even though user B attempts to drag the card, as illustrated in state (2) of FIG. 6.

In this way, with the communication devices 1A and 1B according to the present embodiment, it is possible to provide a minor element of surprise along with a realistic interactive operational feel to the tactics applied by users communicating with the devices.

Conversely, in step S26, when the data based on pressure detected by the pressure detection unit 40 of the communication device 1B is equal to or greater than the threshold, the control unit 10 controls the display unit 30 to display that the selected object can be drawn (step S28). In step S28, the data based on pressure by user B, who operates the communication device 1B, is equal to or greater than the set threshold. In other words, the pressure by user B, who operates the communication device 1B, is equal to or greater than the pressure by user A who operates the communication device 1A. Therefore, in step S28, the control unit 10 allows the selected object to be drawn on the communication device 1B operated by user B.

For example, as illustrated in state (1) of FIG. 6, assume that user A is pressing down on the card γ on the communication device 1A with a certain pressure. In this case, if the pressure when user B attempts to draw the corresponding card on the communication device 1B is equal to or greater than the pressure of user A, then as shown in state (3) of FIG. 6, user B can draw the card corresponding to the card γ. In this context, "display that the selected object can be drawn" can be embodied for example by allowing the card corresponding to the card γ to be dragged when user B drags the card, as illustrated in state (3) of FIG. 6.

Once it is displayed that the object can be drawn in step S28, the control unit 10 executes control for processing after the object is drawn (step S29). This "processing after the object is drawn" may be processing connected to the next event after the object is drawn in the game or other such program, such as processing for reproducing the appearance of user B receiving the card object, or for reproducing the appearance of flipping the card. In the present embodiment, the above-described "predetermined processing" may be processing to "display that the selected object can be drawn" and processing to begin "processing after the object is drawn", or may be processing only to "display that the selected object can be drawn".

In this way, with the communication devices 1A and 1B according to the present embodiment, when users are interacting by communicating with the devices, it is possible to allow users to apply the same tactics as in a face-to-face confrontation and to provide a realistic interactive operational feel.

Embodiment 2

Next, a communication device according to Embodiment 2 of the present invention is described.

Embodiment 2 incorporates modifications to several of the structural members of the above-described communication device 1 according to Embodiment 1. In greater detail, a communication device 2 according to Embodiment 2 is the communication device 1 according to Embodiment 1 with modifications to the structure of the pressure detection unit 40 and the control by the control unit 10. Other than these points, the communication device 2 according to Embodiment 2 can be implemented with basically the same structure as that of the communication device 1 described in Embodiment 1. Therefore, a description of the content already described in Embodiment 1 is omitted below as appropriate.

In the above-described communication device 1 according to Embodiment 1, the pressure detection unit 40 has been assumed to be a member that detects pressure on the entire touch panel 20. Accordingly, for example if user A applies different pressures with different fingers to two different objects on the communication device 1A, it is assumed that processing will be executed as though the same pressure were being applied to both objects.

In Embodiment 2, it is assumed that the touch panel 20 is for example divided into small virtual regions, and that different pressure detection units 40 can detect pressure separately in the divided regions. In this case, in the touch panel 20 in which separate pressures are detected by different pressure detection units 40, the control unit 10 preferably controls the display unit 30 to display different objects.

It may also be assumed that a plurality of small pressure detection units 40 are arranged in a matrix, for example, on the back face of the touch panel 20. In such a case, the pressure can be detected at each position of contact detected by the touch panel 20 by configuring the touch panel 20 using material having a certain degree of flexibility.

In any case, in Embodiment 2, for at least each object displayed on the display unit 30, the pressure detection unit 40 can detect the pressure when the user executes an operation to apply pressure to the object.

First, processing by the communication device 2 on the transmitting end according to the present embodiment is described. In this context, as in Embodiment 1, the communication device 2 "on the transmitting end" refers to the communication device operated by the above-described user A, i.e. the device for the user (A) whose card is selected and drawn by user B. Furthermore, the communication device 2 "on the receiving end" refers to the communication device operated by the above-described user B, i.e. the device for the user (B) who selects and draws at least one of the cards held by user A. Below, the communication device 2 on the transmitting end held by user A whose card is being drawn is labeled "communication device 2A" when appropriate, whereas the communication device 2 on the receiving end held by user B who is drawing a card is labeled "communication device 2B" when appropriate. Note that in the drawings, these devices are simply labeled "device A" and "device B".

Figure 7:
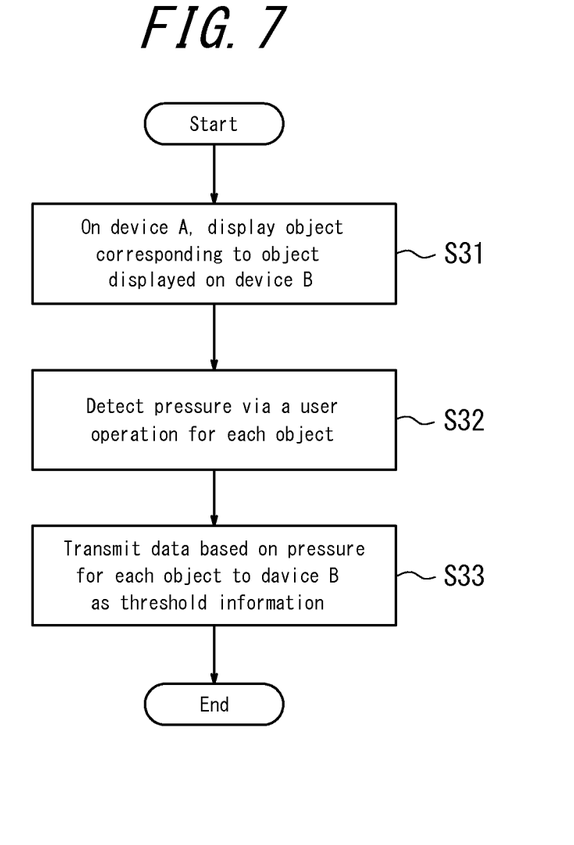
FIG. 7 is a flowchart illustrating processing for transmission by the communication device according to Embodiment 2.

FIG. 7 is a flowchart describing processing by the communication device 2A on the transmitting end according to the present embodiment. Note that at the start of processing by the communication device 2A illustrated in FIG. 7, a plurality of card objects are assumed to be displayed on the display unit 30 of the communication device 2B.

When the processing by the communication device 2A begins, the control unit 10 of the communication device 2A controls the display unit 30 to display an object corresponding to each object displayed on the display unit 30 of the communication device 2B (step S31). Once the processing in step S31 is executed, the display on the display unit 30 of each of the communication devices 2A and 2B is, for example, as illustrated in state (1) of FIG. 6.

State (1) of FIG. 6 illustrates the display unit 30 of the communication device 2B at the top and the display unit 30 of the communication device 2A at the bottom. As illustrated in state (1) of FIG. 6, the display unit 30 of each of the communication devices 2A and 2B displays objects rendered as cards used in a card game.

On the display unit 30 of the communication device 2A for user A, from whom a card is being drawn, the face of the cards held by the user is shown. The example illustrated in state (1) of FIG. 6 shows four cards: α, β, γ, and δ. On the display unit 30 of the communication device 2B for user B, who is drawing a card, the back of the cards held by user A is shown, so that user B cannot see the face of the cards. In the example illustrated in state (1) of FIG. 6, the four cards displayed on the display unit 30 of the communication device 2B for user B correspond, from left to right, to the four cards α, β, γ, and δ displayed on the display unit 30 of the communication device 2A for user A.

Once an object is displayed on the display unit 30 in step S31, the control unit 10 controls the pressure detection unit 40 to detect the pressure on each object when user A executes an operation on the touch panel 20 (step S32). At this point, in step S31, the control unit 10 controls the pressure detection unit 40 to detect pressure when user A presses down on card γ by applying pressure to the touch panel 20, as illustrated in state (1) of FIG. 6. Furthermore, if user A presses down on any card other than that illustrated in state (1) of FIG. 6 (such as card β or δ) with another finger or the like, the control unit 10 controls the pressure detection unit 40 also to detect the pressure at the position corresponding to the other object. Note that in step S32, the pressure detection unit 40 detects a pressure of zero for any card not being pressed down by user A.

When pressure due to an operation by user A is detected for each object in step S32, the control unit 10 controls the communication unit 60 to transmit data based on the detected pressure for each object to the communication device B as threshold information (step S33). In other words, in step S33, the communication unit 60 transmits the data based on pressure detected for each object in step S13 to the communication device B as sets of threshold information associated with respective objects displayed on the display unit 30. At this point, the control unit 10 generates threshold information based on the data based on pressure detected for each object by the pressure detection unit 40. The control unit 10 then executes control so that these pieces of threshold information for the objects are transmitted to the communication device 2B as sets of threshold information associated with respective objects that are displayed on the display unit of the communication device 2B in correspondence with objects displayed on the display unit 30.

Next, processing by the communication device 2 on the receiving end according to the present embodiment is described, i.e. processing by the communication device 2B on the receiving end held by user B who selects and draws at least one of the cards held by user A.

Figure 8:
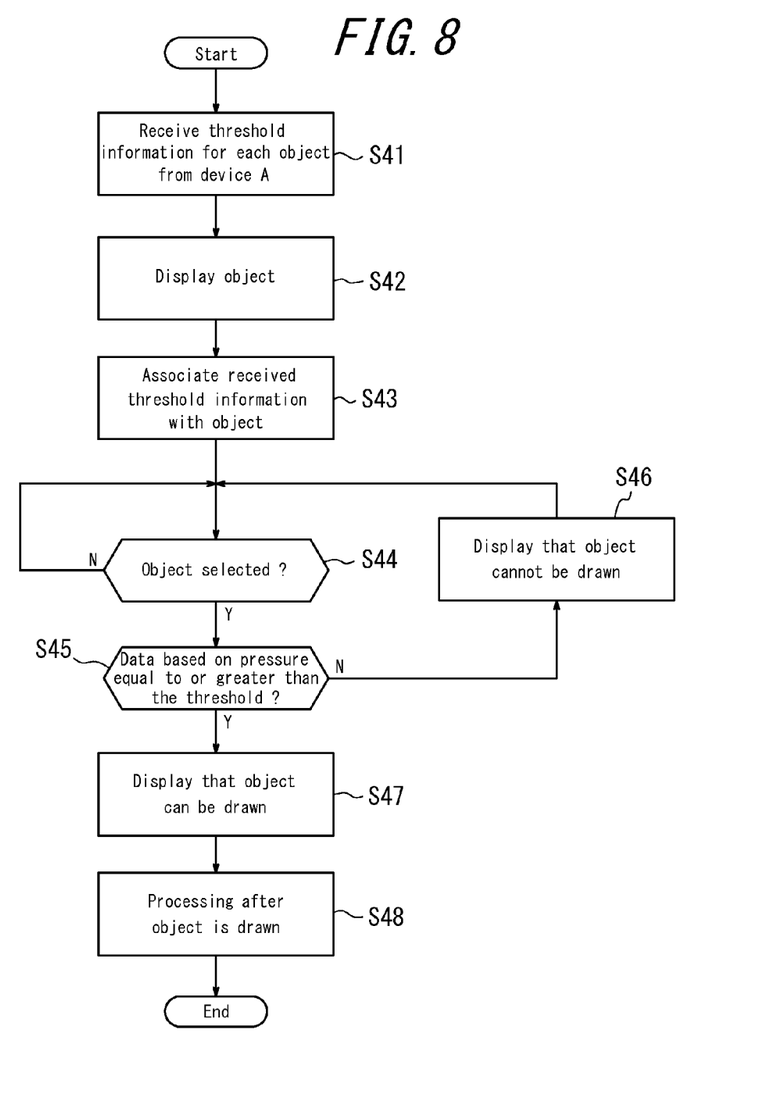
FIG. 8 is a flowchart illustrating processing for reception by the communication device according to Embodiment 2.

FIG. 8 is a flowchart describing processing by the communication device 2B on the receiving end according to the present embodiment. When the processing by the communication device 2B begins, the control unit 10 of the communication device 2B controls the communication unit 60 to receive the threshold information, transmitted by the communication device 2A, for each object (step S41). Note that the threshold information received by the communication device 2B in step S41 is the information transmitted by the communication device 2A in step S33 of FIG. 7.

Once the threshold information for each object is received in step S41, the control unit 10 controls the display unit 30 to display a predetermined object (step S42). Note that the predetermined object displayed by the display unit 30 of the communication device 2B in step S42 is a plurality of card objects already displayed by the display unit 30 of the communication device 2B at the start of processing by the communication device 2A in FIG. 7. Once the processing in step S42 is executed, the display on the display unit 30 of the communication device 2B is, for example, as illustrated at the top of state (1) of FIG. 6.

Once the objects are displayed on the display unit 30 in step S42, the control unit 10 associates the threshold information received for each object in step S41 with the objects displayed on the display unit 30 (step S43). In this way, the data based on pressure when user A applies pressure to an object on the communication device 2A is set as a threshold for the data based on pressure at which a corresponding object displayed on the display unit 30 of the communication device 2B can be drawn.

Once the threshold information is associated with each object in step S43, the control unit 10 determines whether any object displayed on the display unit 30 has been selected via an operation by user B (step S44). In greater detail, in step S44 the control unit 10 determines whether contact with a contacting body, such as user B's finger, has been detected on the touch panel 20 at the position corresponding to any object displayed on the display unit 30. When contact with a contacting body, such as user B's finger, has been detected on the touch panel 20 at positions corresponding to a plurality of objects displayed on the display unit 30, a plurality of contacts is detected.

When contact on the touch panel 20 corresponding to a position of any object is detected in step S44, the control unit 10 determines whether the data based on pressure detected by the pressure detection unit 40 is equal to or greater than the threshold for data based on pressure set for the corresponding object (step S45). In other words, in step S45, the control unit 20 determines whether user B, who operates the communication device 2B, is applying pressure equal to or greater than pressure by user A, who operates the communication device 2A, to each object on the communication device 2B corresponding to an object to which user A is applying pressure.

When the data based on pressure detected by the pressure detection unit 40 of the communication device 2B is not equal to or greater than the threshold set for the corresponding object in step S45, the control unit 10 controls the display unit 30 to display that each selected object cannot be drawn (step S46). In step S46, the data based on pressure by user B, who operates the communication device 2B, is not equal to or greater than the set threshold. In other words, the pressure by user B, who operates the communication device 2B, does not reach the pressure by user A who operates the communication device 2A. Therefore, in step S45, the control unit 10 does not allow the selected objects to be drawn on the communication device 2B operated by user B.

In this way, with the communication devices 2A and 2B according to the present embodiment, as in Embodiment 1, it is possible to provide a minor element of surprise along with a realistic interactive operational feel to the tactics applied by users communicating with the devices.

Conversely, when the data based on pressure detected by the pressure detection unit 40 of the communication device 2B is equal to or greater than the threshold set for the corresponding object in step S45, the control unit 10 controls the display unit 30 to display that each selected object can be drawn (step S47). In step S47, the data based on pressure by user B, who operates the communication device 2B, is equal to or greater than the set threshold. In other words, the pressure by user B, who operates the communication device 2B, is equal to or greater than the pressure by user A who operates the communication device 2A. Therefore, in step S47, the control unit 10 allows each selected object to be drawn on the communication device 2B operated by user B.

Note that when a plurality of objects is selected in step S44, there may be both an object for which the data based on pressure detected by the pressure detection unit 40 in step S45 is equal to or greater than the set threshold and an object for which the data is not equal to or greater than the set threshold. In this case, the processing in step S47 is executed for each object for which the detected data based on pressure is equal to or greater than the set threshold, and the processing in step S46 is executed for each object for which the detected data based on pressure is not equal to or greater than the set threshold.

Once it is displayed that the object can be drawn in step S47, the control unit 10 executes control for processing after the object is drawn (step S48).

In this way, according to the present embodiment, as in Embodiment 1, when users are interacting by communicating with the devices, it is possible to allow users to apply the same tactics as in a face-to-face confrontation and to provide a realistic interactive operational feel. Furthermore, with the communication devices 2A and 2B according to the present embodiment, the effects described in Embodiment 1 can be achieved simultaneously for a plurality of objects. Accordingly, for content such as a game, it is possible to allow users to apply the same tactics as in a face-to-face confrontation and to provide a realistic interactive operational feel for a wider variety of situations.

The present invention is not limited to the above embodiments, and a variety of modifications and changes may be made. For example, the processing in each of the above embodiments is illustrated using a particular situation in a game as an example. Accordingly, in the processing by the communication device according to the present embodiments and a communication system that includes the communication device, processing with a variety of structures may be adopted as long as logical consistency is maintained. For example, the order of steps for operations and processing can of course be altered as necessary.

In the above embodiments, the touch panel 20 itself is used to detect contact on the touch panel 20. In other words, in the above embodiments, the "touch panel 20" is assumed to be a member such as a so-called touch sensor. The touch panel used in the communication device according to the present invention, however, may be any member that is contacted by a contacting body such as the operator's finger, a stylus pen, or the like.

For example, the touch panel used in the electronic device according to the present invention can be a member such as a simple "panel" that does not detect the position of contact by the contacting body on the touch panel (i.e. a panel without a sensing function). In an electronic device with such a structure, it can be determined that the touch panel has been contacted when, for example, a pressure detection unit detects pressure that satisfies a predetermined pressure standard. Such a pressure detection unit can be configured using any number of strain gauge sensors or the like provided on the touch panel 20.

In the above embodiments, the touch panel 20 itself is used to detect contact on the touch panel 20. When pressure detected on the touch panel 20 satisfies a predetermined pressure standard, however, it can be determined that the touch panel 20 has been contacted. In the case of such pressure detection, a structure may be envisioned whereby any number of strain gauge sensors or the like is provided on the touch panel 20, and by detecting strain of the touch panel 20 due to pressure, the pressure on the touch panel 20 is calculated from the strain.

The tactile sensation providing unit 50 may be configured using any number of piezoelectric vibrators, or a transparent piezoelectric element on the entire surface of the touch panel 20. An eccentric motor configured to rotate once per period of a drive signal may also be used.

The above embodiments have been described assuming a configuration in which the touch panel 20 is layered on the front face of the display unit 30. In the electronic device according to the present invention, however, such a configuration is not necessarily required. A configuration in which the touch panel 20 and the display unit 30 are separated may be adopted. A configuration in which the touch panel 20 is layered on the front face of the display unit 30, however, makes it easier for the operator to recognize the relationship between the displayed image and the generated vibration (as well as the predetermined processing that starts).

Furthermore, the display unit 30 and touch panel 20 in the above embodiments may be configured using an integrated device, for example by providing a common substrate with the functions of both a display unit and a contact detection unit. An example of such a device integrating the functions of both a display unit and a contact detection unit is a liquid crystal panel having a matrix of pixel electrodes, with a plurality of photoelectric conversion elements, such as photodiodes, regularly mixed therein. Such a device is contacted by a pen for touch input at a desired position on the panel display, and while displaying an image with the liquid crystal panel structure, the device can detect the contact position by light from a backlight for liquid crystal display being reflected by the tip of the pen and received by surrounding photoelectric conversion elements.

The tactile sensation providing unit 50 may be configured to vibrate the touch panel 20 indirectly by causing the electronic device to vibrate via a vibration motor (eccentric motor) or the like, or to vibrate the touch panel 20 directly by arranging a piezoelectric element or the like on the touch panel 20.

In the embodiments, it has been described that at the start of processing by the communication device 1A, a plurality of card objects are displayed on the display unit 30 of the communication device 1B. The present invention is not, however, limited in this way. A card object may be displayed concurrently on the display unit of the communication device 1A and of the communication device 1B.

Furthermore, in the embodiments, the case has been described in which after the communication device 1A receives information on the selected object from the communication device 1B, data based on pressure due to user operation is detected, and the data based on detected pressure is transmitted to the communication device B as the threshold information. The present invention is not, however, limited in this way. Data based on pressure due to user operation may be detected, and the data based on detected pressure may be transmitted to the communication device B as the threshold information regardless of whether the communication device 1A has received information on the selected object from the communication device 1B.

Furthermore, in the embodiments, the case has been described in which the communication device 1A generates threshold information based on the data based on pressure detected by the pressure detection unit 40. The present invention is not, however, limited in this way. Via an operation on the touch panel 20 or on a mechanical key, 1 N may be directly designated as the threshold information, for example, so that a threshold of 1 N is set for the data based on predetermined pressure on the communication device 1B.

REFERENCE SIGNS LIST

1: Communication device
10: Control unit
20: Touch panel
30: Display unit
40: Pressure detection unit
50: Tactile sensation providing unit
60: Communication unit
70: Storage unit
80: Operation input unit

The invention claimed is:
1. A communication device comprising:
a communication unit configured to communicate with another communication device separate from the communication device;
a display unit configured to display an object corresponding to an object displayed on an other display unit of the other communication device; and
a control unit configured to control the communication unit to transmit threshold information associated with the object displayed on the display unit to the other communication device,
wherein the threshold information corresponds to detected pressure, and
the object displayed on the display unit is moved only when an other detected pressure detected by the other communication device is equal to or greater than the threshold information.

2. The communication device according to claim 1, further comprising a pressure detection unit configured to detect pressure, wherein
the control unit generates the threshold information in accordance with data based on pressure detected by the pressure detection unit and controls the communication unit to transmit the threshold information to the other communication device as the threshold information associated with the object that is displayed on the other display unit of the other communication device and that corresponds to the object displayed on the display unit.

3. A communication system including a first communication device and a second communication device separate from the first communication device, wherein
the first communication device transmits threshold information associated with an object displayed on a display unit of the first communication device to the second communication device,
the second communication device receives the threshold information transmitted by the first communication device and associates the threshold information with an object that is displayed on a display unit of the second communication device and that corresponds to the object displayed on the display unit of the first communication device,
the threshold information corresponds to detected pressure, and
the object displayed on the display unit of the first communication device is moved only when an other detected pressure detected by the second communication device is equal to or greater than the threshold information.

4. The communication system according to claim 3, wherein
the first communication device and the second communication device are each provided with a pressure detection unit configured to detect pressure,
the first communication device generates the threshold information in accordance with data based on pressure detected by the pressure detection unit of the first communication device, and
based on the threshold information received from the first communication device, the second communication device sets a threshold for data based on pressure detected by the pressure detection unit of the second communication device.

\* \* \* \* \*